United States Patent
Kawashimo et al.

(10) Patent No.: US 7,127,717 B2
(45) Date of Patent: Oct. 24, 2006

(54) HIERARCHICAL SERVER SYSTEM

(75) Inventors: Tatsuya Kawashimo, Kokubunji (JP); Yoshio Miki, Kodaira (JP); Hiroaki Fujii, Tokorozawa (JP); Akihiro Takamura, Koganei (JP)

(73) Assignee: Hitachi, Ltd., Chiyoda-ku (JP)

( * ) Notice: Subject to any disclaimer, the term of this patent is extended or adjusted under 35 U.S.C. 154(b) by 608 days.

(21) Appl. No.: 10/216,846

(22) Filed: Aug. 13, 2002

(65) Prior Publication Data

US 2003/0120724 A1 Jun. 26, 2003

(30) Foreign Application Priority Data

Dec. 25, 2001 (JP) .......................... P2001-390822

(51) Int. Cl.
G06F 9/46 (2006.01)
G06F 11/00 (2006.01)
G06F 15/173 (2006.01)

(52) U.S. Cl. ........................ 718/105; 714/4; 709/224

(58) Field of Classification Search ........ 709/223–226; 718/105; 714/4
See application file for complete search history.

(56) References Cited

U.S. PATENT DOCUMENTS

| | | | |
|---|---|---|---|
| 5,774,668 A | 6/1998 | Choquier et al. | |
| 5,867,706 A | 2/1999 | Martin et al. | |
| 5,951,634 A | 9/1999 | Sitbon et al. | |
| 5,951,694 A | 9/1999 | Choquier et al. | |
| 6,128,279 A * | 10/2000 | O'Neil et al. | 370/229 |
| 6,477,522 B1 * | 11/2002 | Young | 707/2 |
| 6,539,494 B1 * | 3/2003 | Abramson et al. | 714/4 |
| 6,560,717 B1 * | 5/2003 | Scott et al. | 714/4 |

FOREIGN PATENT DOCUMENTS

| | | |
|---|---|---|
| JP | 2001-5713 | 6/1999 |
| JP | 2001-22714 | 7/1999 |

* cited by examiner

Primary Examiner—Meng-Al T. An
Assistant Examiner—Camquy Truong
(74) Attorney, Agent, or Firm—Reed Smith LLP; Satnley P. Fisher, Esq.; Juan Carlos A. Marquez, Esq.

(57) ABSTRACT

A hierarchical server system efficiently balances the processing load thereon and for shortening the processing time therein is provided, such as a web server system. A system controller, a load balancing device, and a shared memory are provided in a multi-layer server system made of a plurality of servers. When processing implemented with a first layer server is temporarily stopped in order to acquire information needed for processing from a second layer server, process information needed to resume the processing is recorded in the shared memory. When the necessary information is sent back to the first layer server, the system controller inquires about work statuses of all first layer servers to select another first layer server to resume the processing based upon the inquiry results. The then selected first layer server then resumes the processing using the information that was sent back and the process information in the shared memory.

17 Claims, 6 Drawing Sheets

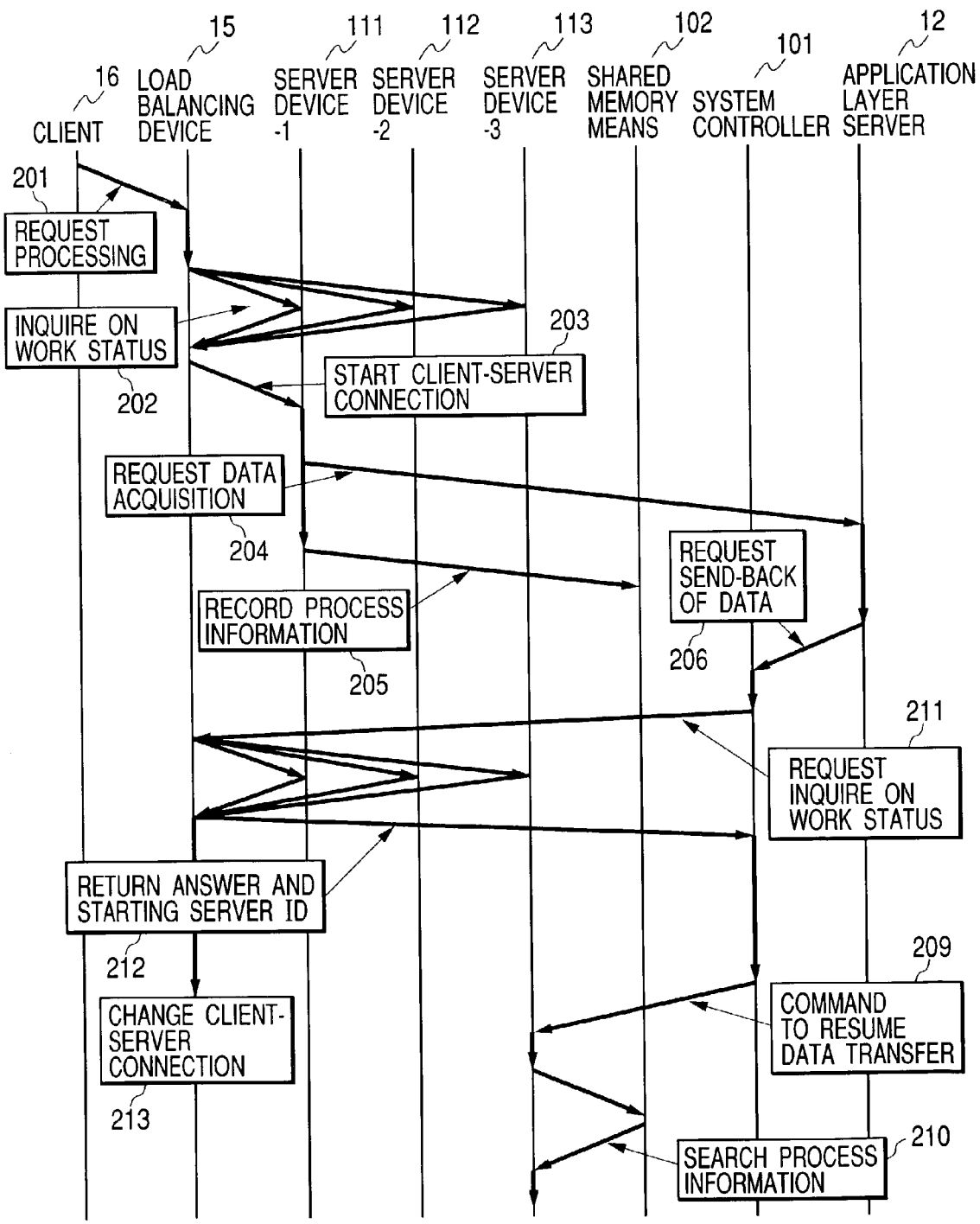

HIERARCHICAL SERVER SYSTEM

FIELD OF THE INVENTION

The present invention relates to load balancing control method among multi-layer server computers, and more specifically relates to a multi-layer server system for the WWW (World Wide Web) for efficient processing of requests from multiple clients over the Internet and for notifying the clients of the results.

BACKGROUND OF THE INVENTION

In recent years, a diverse range of businesses is appearing on the Internet, such as electronic business transactions (or e-commerce). In order to successfully secure business opportunities, the WWW (World Wide Web) server system supporting these Internet businesses must shorten as much as possible the processing time required for accessing and processing requests from a rapidly increasing number of clients.

A server system of this type, capable of efficiently processing a large volume of access requests, is comprised of three layers, i.e., a web layer server to acquire the necessary data and provide the information to the client in response to a processing request from the client, an application layer server to process data stored in the database and send the desired data to the web layer server in response to a data acquisition request from the web layer server, and a database layer server to access the database, acquire the data prior to processing and send it to the application layer server. The triple layer web server system is connected by communication paths typically consisting of a LAN (Local Area Network).

To distribute the workload, each layer of the triple layer server system operates plural server devices or operates plural logical system units with a shared memory, i.e., multiprocessor system consisting of plural processors, plural main memory means accessible from any of the processors, and a connecting means connecting together these processors and the main memory means such that processing is executed similarly in any one server device or one logical system unit. The triple layer server system also efficiently handles large numbers of processing requests by installing a load balancing device to monitor the work status of these multiple server devices or logical system units at the start of processing on each layer and then selecting at least one appropriate server according to that work status.

A block diagram of the web server system 1 of the related art is shown in FIG. 3. The web server system, as indicated above, is made up of a web layer server 11, an application layer server 12, and a database layer server 13 to acquire data from the database device 14. The web layer server 11 in FIG. 3 is comprised of multiple server devices 11 to quickly and efficiently handle the many processing requests. When a processing request arrives from the client 16 by way of wideband communication path 1, such as a WAN (Wide Area Network), a load balancing device 15 decides the connection point (destination) according to the work status of the web layer server.

In the figure, the process request from the client 16 is received by the load balancing device 15. When the process request is received by the load balancing device 15, the work status, or more particularly, the load status, and number of sessions currently being processed, of all or some of the server devices 11 are acquired, the server capable of the most efficient processing is selected, and its connection with the client is made. The selected server receives the process request from the client and starts the processing. If necessary, after processing starts, a data acquisition request is sent to the application layer server 12 and the database layer server 13, and the server device continues processing when the data is acquired.

Technology of the known art relating to the load balancing device is discussed as follows.

JP-A-22714/2001 discloses a method for determining the degree of importance (criticality) of processing requested from the client, and then utilizing this criticality to balance the load.

U.S. Pat. Nos. 5,774,668 and 5,951,694 disclose method for dispersing the load on the application server by using a gateway device to bear the connection load between the client and multiple application servers.

A method disclosed in U.S. Pat. No. 5,867,706 disperses the load on each processor on parallel servers.

U.S. Pat. No. 5,951,634 discloses a method for dispersing the load in a multiple server system.

Another example of the known art for reducing web server processing time is disclosed in JP-A-5713/2001, wherein, when data is accessed in a database, the data is held in an auxiliary memory device or a so-called database cache such that the data can be obtained at high speed from the auxiliary memory device when a data request for accessing the data is made from then onwards.

In the web server system of the related art, loads are only balanced for connection requests from the client, and the load is optimized on each server. In a system of this kind, when handling multiple processing requests, time dispersion occur in acquiring or creating the data for each of the processing requests.

In processing in the web server of the related art, differences in the amount of acquired data caused dispersion in the time needed for creating and acquiring the data. Applying high-speed data acquisition technology such as database caches also caused dispersion in the time needed for creating and acquiring the data, since the processing content caused differences in the time needed to access the database storing the data required for processing.

In those cases, at the start of processing, i.e., when the connection request is received to start processing, connections are assigned to the multiple servers receiving these multiple processing requests such that the load on these servers will be uniform. However, when, for example, one portion of the assigned servers are assigned a heavy processing load requiring a long time, and the other servers are assigned relatively light processing loads requiring a short time, then the dispersion (or variations) in processing times allows, as processing continues, the load concentrated in just one or some of the servers.

SUMMARY OF THE INVENTION

One object of the present invention is to provide a server system to quickly eliminate the state where the load is concentrated on one or some of the servers or logical processors due to dispersion in processing time and reduce delays in responses to the client.

A more specific object of the present invention is to provide a server system capable of changing connections with servers or logical processors doing the processing, as well as between the clients and the servers or the logical processors, even during execution of a processing request.

The multi-layer server system of the present invention is characterized in distributing the processing requests sent from the request source, after the processing in one most suitable first layer server is temporarily stopped to wait for data acquisition from a second layer server, the processing is resumed after receiving the data from the second layer server with another most suitable first layer server. A shared memory means stores the processing contents and the information required for resuming the processing. When resuming the processing after data acquisition is completed, the load balancing device monitors the load status of the plurality of servers, transfers to the another most suitable first layer server the information stored in the shared memory means for resuming the processing therein.

When a multiprocessor system is divided up into plural logical systems (logical partitions), the plurality of logical system units are defined as information processor devices to execute the actual processing, and a main memory area accessible for all the logical system units is provided for storing information required for resuming the processing. A system controller is defined for monitoring the work status of other logical system units defined as information processor devices and for selecting logical system units (consisting of one or more CPUs) to resume processing.

The present invention is further configured such that each information processor device corresponds to an information generating device for acquiring data needed for processing. When the processing in the logical system is stopped, all or a portion of the information of the stopped processing is recorded in the shared memory means. The information generating device then creates data for the applicable processing, and sends it to the information processor device. A system controller monitors the work status of all logical systems, selects the optimal logical system, and instructs the optimal logical system to resume the processing.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein:

FIG. 7 is a chart of the operation flow of another embodiment of the load balancing control method of the present invention.

DETAILED DESCRIPTION OF THE PREFERRED EMBODIMENTS

The embodiments of the present invention are described referring to the accompanying drawings. The following description describes the case of a triple layer web server system.

Figure 1:
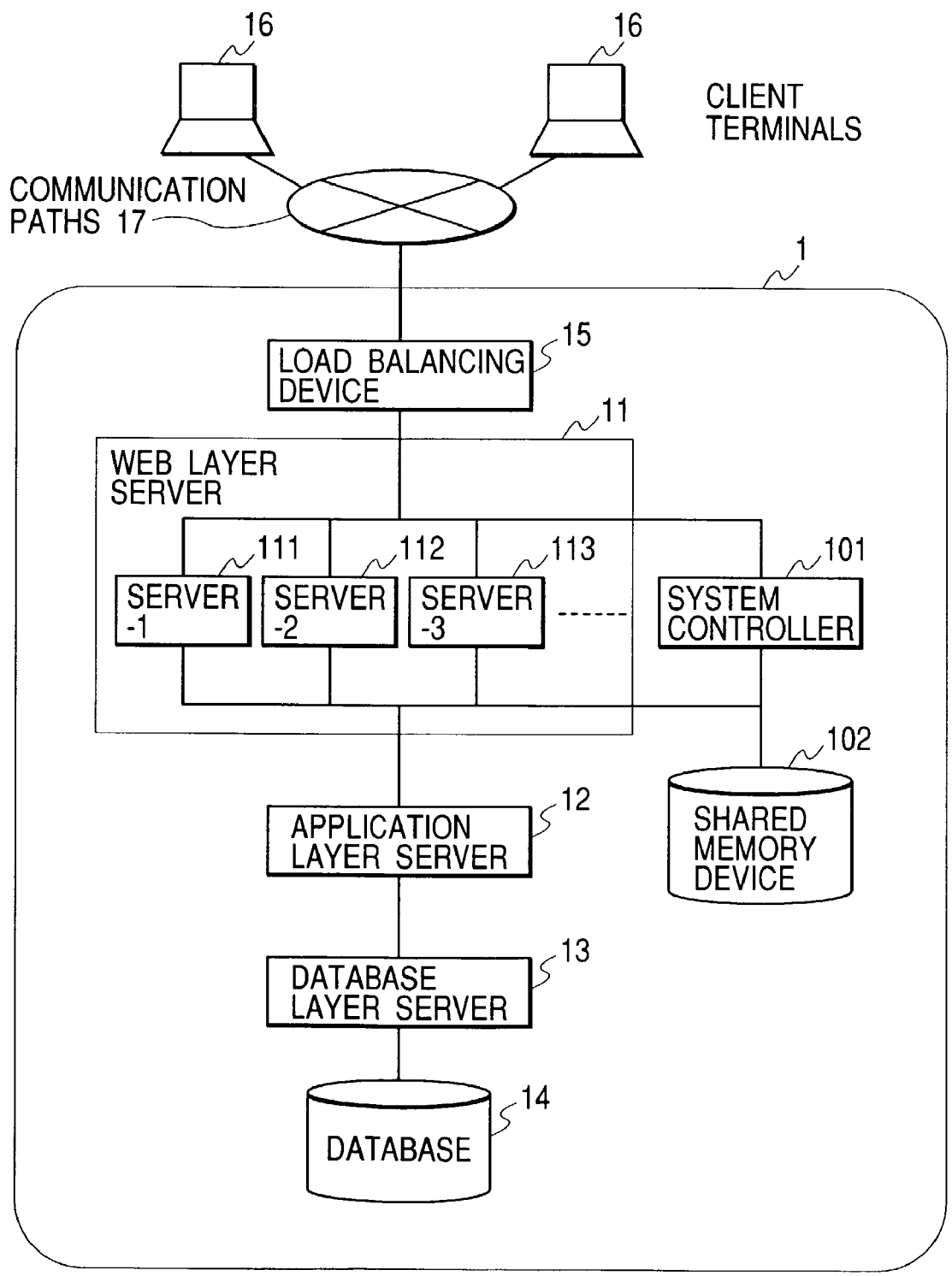
FIG. 1 is block diagram showing the server system of the present invention.
Figure 3:
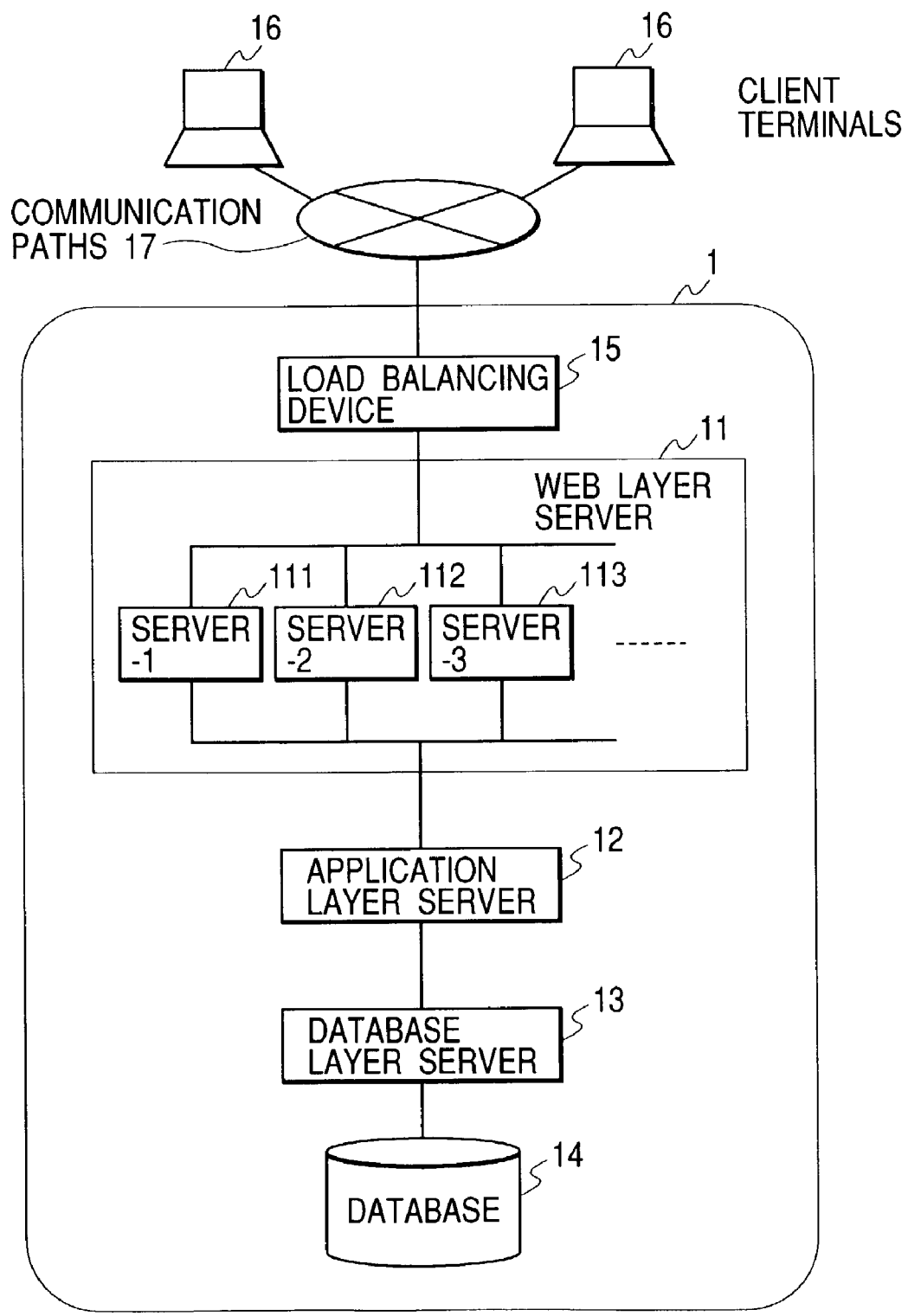
FIG. 3 is a block diagram showing the structure of the server system of the related art.

In FIG. 1, a triple layer web server system is implemented in the web layer server by using the load balancing method of the present invention. The basic structure of the web server system conforms to the system shown in FIG. 3.

In other words, the processing request from a client 16 is received by a load balancing device 15. When the processing request is received, the load balancing device 15 acquires the work status, or in other words, acquires the load status and number of sessions currently being processed, of all or a portion of the servers 111 making up the web layer server 11, selects the server most capable of efficient processing, and makes a connection to the client. In this embodiment, a system controller 101 and a shared memory mean 102 are connected to the web layer server 11 to implement the unique load balancing method of the present invention.

When a data creation request is issued to the application layer server 12 and processing implemented by the server 111 belonging to the web layer server 11 is temporarily stopped to acquire the necessary data, process information is simultaneously recorded along with a process identifier in the shared memory means 102 to also allow other server devices to resume processing from the point in time where the applicable processing was stopped. The system controller 101 receives the data for the data create request sent from the application layer server 12, selects the server device to resume the applicable processing, sends the created data and process information for the applicable processing stored in the shared memory means 102 to the server, and instructs it to resume processing.

Figure 2:
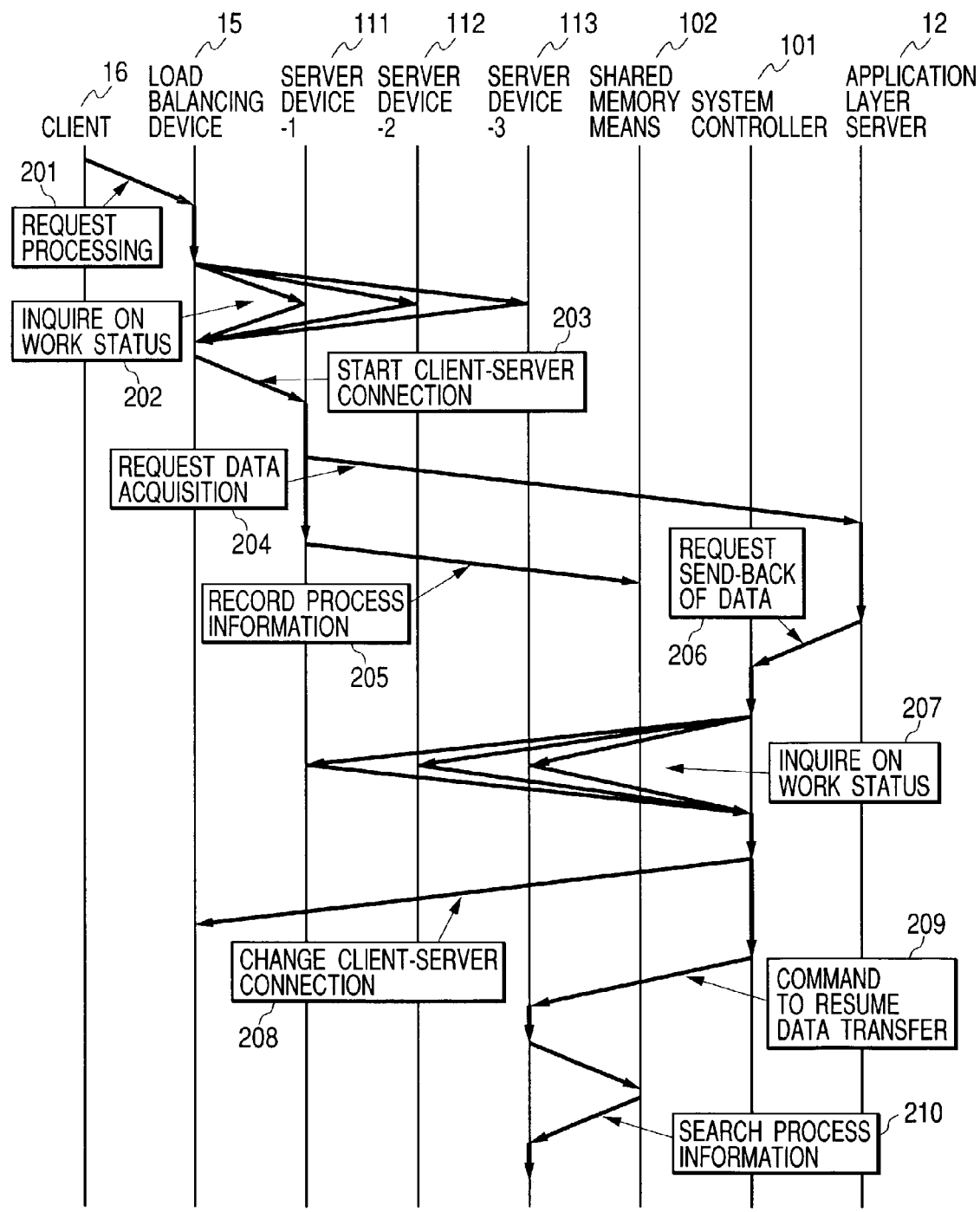
FIG. 2 is a chart of the operation flow of the load balancing control method of the present invention.

Operation of the load balancing control method of the present invention is next described while referring to FIG. 2.

The load balancing device 15 makes an inquiry on the work status of the server devices 111, 112 and 113 in a step 202, and selects from the results, a first server device 111 is chosen as the most efficient server to implement the processing upon receiving the request for processing in a step 201. The first server device 111 starts the processing by means of the client-server device connection and the step of Start client-server connection in a step 203. Here, when a need for data occurs in the applicable processing, the server device 111, simultaneously commanding a data acquisition request in a step 204 to the application layer server 12, records the process information for resuming the processing in a step 205. In application server layer 12, when the data needed for the applicable processing has been made and a data reply request is sent in a step 206, the system controller 101 makes a work status inquiry in a step 207 to find the work status of the server devices 111, 112 and 113, and selects a server device for resuming the processing. A server to implement the following processing most efficiently is selected based on conditions, such as the server device with the lightest load from among server devices 111, 112 and 113 or having the smallest amount of currently executed processing is selected after receiving data from the application layer server 12 and the inquiry for work status in a step 207. If the selected server device is the third server 113, the processing is resumed by a server different from the server device 111 that first implemented the processing so as to employ the best server after the application layer data processing time. In this case, the system controller 101 first sends a Change client-server connection instruction in a step 208 to the load balancing device 15 to change the connection between the client 16 and the server device 111 to a connection between the client 16 and the server device 113. The system controller 101 then transfers the data acquired from the application layer server 12 to the server device 113, and also sends a Command to resume data transfer in a step

209. Since the server device 113 that received the transferred data and the Command resume of data transfer in the step 209, is different from the server device 111 that performed the initial processing before data acquisition, it (server 113) does not have the process information required to resume processing. The server device 113 therefore makes a search for process information in a step 210 in the shared memory means 102 for process information for resuming the processing, and then resumes the processing. In this way, after the processing is stopped to acquire data, a more efficient web layer server can be utilized by dispersing the load when acquiring data and resuming processing.

An example utilizing the shared main memory type multiprocessor system in the present invention is described next. The shared main memory comprising the platform for installing the present invention and its operating method are first explained.

Figure 4:
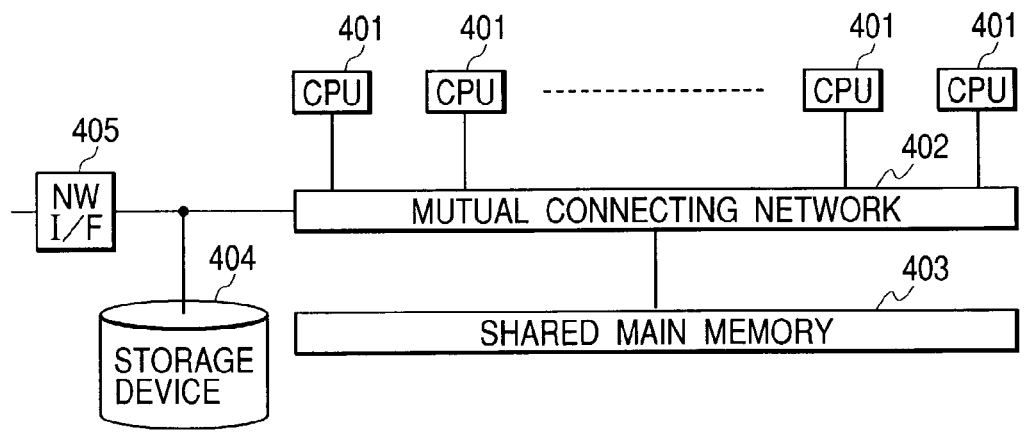
FIG. 4 is a diagram of the shared main memory multiprocessor system.
Figure 5:
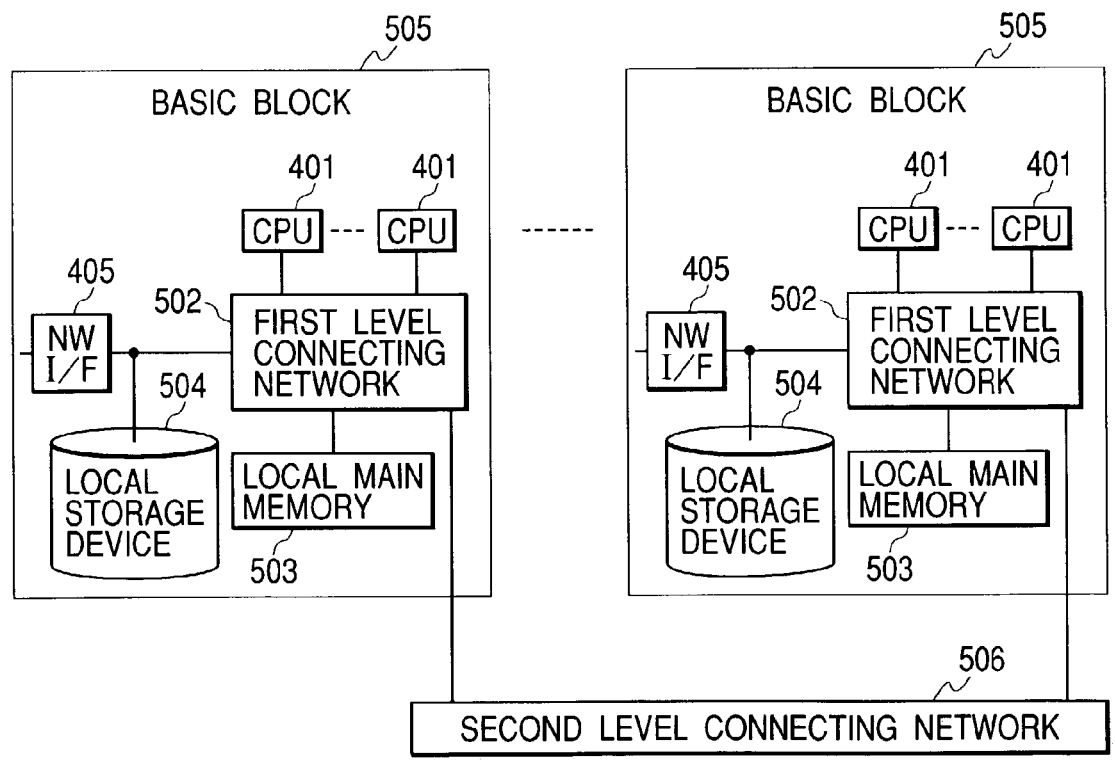
FIG. 5 is a diagram of the shared main memory multiprocessor system.

FIG. 4 and FIG. 5 are example diagrams of the shared main memory multiprocessor system as the platform for implementing the load balancing method of the present invention. The structure in FIG. 4 is generally referred to as a Symmetric Multi-Processor (SMP). This system mainly comprises a plurality of CPUs 401, a mutually connecting network 402, a shared main memory 403, a storage device 404, and an external network interface 405. The plurality of CPUs 401, the shared main memory 403, and the storage device 404 are connected with each other by way of the mutually connecting network 402. Generally, the shared main memory 403 though shown logically as a single structural element in the drawing, is physically comprised of multiple segments, and these respective segments are mutually connected to the network 402. The mutually connecting network 402 may be structured by different methods, such as buses or crossbar switches, etc. In a system of this kind of structure, the resources constituted by the shared main memory 403 and the storage device 404, and the external network interface 405 can be accessed from any of the CPUs 401.

The structure in FIG. 5 is generally called a Non-Uniform Memory Access (NUMA) system. This system is comprised of multiple basic blocks 505 made of multiple CPUs 401, a first level connecting network 502, a local main memory 503, and a local storage device 504, joined by a second level connecting network 506. The basic blocks 505 are equivalent to the SMP system shown in FIG. 4. The second level connecting network 506 mutually connects the first level connecting networks 502 in the basic blocks 505. In a structure of this type, the local main memory 503, and the local storage device 504 within the system are capable of being cross-accessed beyond its own framework of the basic blocks 505 from any CPUs 401 within the system. When accessing, for example, the local main memory 503, the local storage device 504, or the external network interface 405 inside the basic block 505 on the left side of the figure from the CPUs 401 in basic block 505 on the right side of the figure, the applicable local main memory 503, the local storage device 504, or the external network interface 405 can be accessed from the applicable CPUs 401 via the first level network 502 within the basic block 505 to which the applicable CPUs belongs and the second level connecting network 506, and further via the first level network 502 within the basic block 505 to which the local main memory 503, the local storage device 504 or the external network interface 405 constituting the access destination.

In a system configured this way, if a layered (hierarchical) mutual connecting network consisting of multiple first level connecting networks 502 and second level mutual connecting networks 506 is logically viewed as one network, the structure would be equivalent to the logical structures in FIG. 4 and FIG. 5. In that aspect, a mere physical difference in the structures of FIG. 4 and FIG. 5 would exert no particular effect in executing the load balancing method of the present invention. The minimum required condition for the platform to implement the load balancing method of the present invention is having a "shared main memory type" of a multiprocessor.

One operating configuration for the shared main memory multiprocessor shown in FIG. 4 or in FIG. 5 defines logical operating control units called logical partitions that combine portions of an arbitrary number of CPUs 401 and shared main memories 403 (or plural local main memories 503) within the same system. There is a method to achieve an operation with a single logical system. This method physically consolidates what are essentially total systems comprised of multiple physical server systems, into one system to reduce the total system operating costs.

Figure 6:
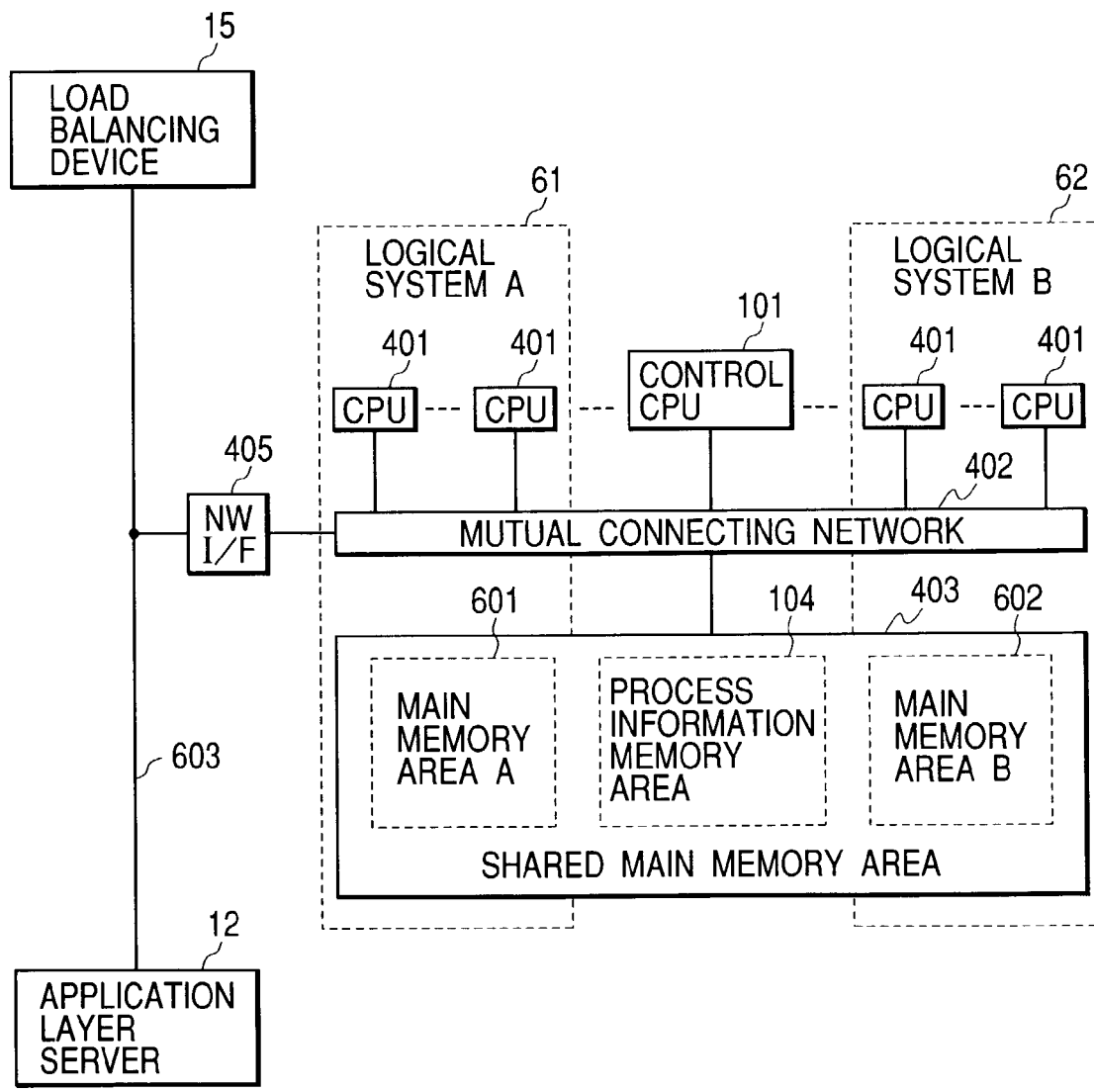
FIG. 6 is a block diagram showing the system structure when the shared main memory multiprocessor system is installed according to the load balancing control method of the present invention.

The load balancing control method of the present invention when utilizing the shared memory multiprocessor system shown in FIG. 4 or FIG. 5 is next explained in detail while referring to FIG. 6.

These multiple logical systems are shown by the two logical systems: A61 and B62. The logical system A61 and the logical system B62 each have multiple CPUs 401 and a portion of the shared main memory 403. A portion of the shared main memory area 403 controlled by this logical system A61 is the main memory area A601. A portion of the shared main memory 403 controlled by the logical system B62 is the main memory area B602. Elements in this system are a system controller CPU 103 which is one of the CPUs 401 used as the system controller, and a process information memory area 104 as portion of the area on the shared memory area 403 used as the shared memory means.

The operation of the load balancing method of the present invention, when the shared memory multiprocessor system shown in FIG. 6 is applied to the web layer server 11 of FIG. 1 is described next. The shared memory multiprocessor system shown in FIG. 6 is connected by way of the network interface 405 and a communication path 603, such as a LAN, to the load balancing device 15 and the application layer server 12.

In this embodiment also, the processing request from the client 61 is received by the load balancing device 15. When the processing request is received, the load balancing device 15 acquires the work status, or in other words, the number of sessions currently being processed and the load status, of the logical systems B61, B62 set to comprise the web layer server 11, selects the logical system capable of processing most efficiently, and makes a connection to the client.

The case when processing is executed by the logical system A61 is considered next. When a data acquisition request is sent to the layers under the application layer server 12 by way of the external network 405 and the communications path 603 in order to acquire data, all or a portion of the process information needed to resume the applicable processing is simultaneously recorded in the process information memory area 104. When sending the acquired data back from the application server layer 12, the system controller CPU 103 inquires about the work status of the logical system units 61 and 62, and selects either the logical system A61 or logical system B62 from the results obtained from the work status inquiry, and instructs it to resume processing. If the logical system B62 is selected, the logical system that resumes the processing is different from the logical system that executed the processing before it was stopped such that the system controller 103 instructs the load balancing device 15 to change the connection with the client and provide the processing resume information in the process information memory area 104 to the logical system B62. Based on this information, the logical system B62 loads the data and process information needed to resume processing into the main memory area 602 from the process information memory area 104 and the main memory area 601 of logical system A61, and resumes the processing.

A load balancing device can therefore also be achieved on a shared memory multiprocessor system as described above. The system controller and shared the memory means which are the main elements of the present invention can be respectively implemented via a system controller CPU and a process information storage area utilizing a portion of the shared memory area, in conjunction with the CPU on the shared memory multiprocessor system. Since there is no need to add new hardware, the platform used to implement the present invention does not incur any additional cost.

On the shared memory multiprocessor system, the main memory can be searched from any of the CPUs. Therefore, there is generally no need to record all process information needed to resume processing onto the process information memory area 104 but a pointer showing the area on the main memory area A601 where process information is present is sufficient. The logical system B62 accesses the main memory area 601 of the logical system A61, based on the pointer information in the process information memory area 104 such that the processing can be resumed by copying process information to the main memory area 602 of the logical system B62. Some operating methods however, are not capable of searching the main memory areas of mutually different logical systems. In such cases, a method can be used where the system controller CPU 103 copies process information into the main memory area, such as the process information memory area 104, to resume the processing.

FIG. 7 is a chart of the operation flow of another embodiment of the load balancing control method of the present invention. The load balancing method shown in FIG. 7 is characterized in that, unlike the operation shown in FIG. 2, when the data sent back from the application layer server 12 after the work status inquiry, an instruction is sent from the system controller via the load balancing device 15 rather than directly from the system controller itself. In other words, the work load status of the web layer servers is requested by the load balancing device 15 (rather than the system controller 101 as in the Embodiment 1) to select another best web layer server therein then the load balancing device 15 informs the system controller 101 the ID of the selected web server. As such, there is no need for the system controller 101 to update the load balancing device 15 about the work status or the selected web server so as to change the client-server connection. FIG. 7 shows in detail the load balancing method operation for the triple layer web server system of FIG. 1. The same operation can also be implemented on the shared main memory multiprocessor system shown in FIG. 6.

The operation in FIG. 7 is the same as in FIG. 2 up to the point where the application layer server 12 sends back via the Request send-back of data in the step 206 in response to a data acquisition request from the server device 11. When the request send-back of data is received, the system server controller 101 sends an inquiry on work status of server devices 111, 112 and 113 to the load balancing device 15. In response to the inquiry on work status in a step 211 from the system controller 101, the load balancing device 15 inquires the work status of server devices 111, 112 and 113, selects a server device to execute the applicable processing, sends back a resuming server ID in a step 212 and changes the client-server connection to the resuming server device in a step 213. When the ID for the server device for resuming processing is received from the load balancing device 15, the system controller 101 sends a command to resume data transfer in a step 209 to the resuming server device to resume processing. If the selected server device is the third server device 113, it receives the command to resume of data transfer in the step 209 and resumes the processing.

The embodiments of the present invention were explained above. The embodiments showed as examples where the triple web server system is implemented with plural servers, and a shared main memory multiprocessor system capable of executing multiple processing is implemented by plural logical system units. The present invention, however, is applicable not only to web layer servers, but also to application layer servers comprised of plural server devices, or a multi-layer server group of multiple separate servers.

In the above described present invention, by providing a system controller for commanding the switching of the server device executing the processing in a server system made of multiple server devices, and a shared memory means for holding process resume information, load balancing can be implemented not only during the start of processing with a processing request from a system processing request source, but also when the processing is temporarily stopped during data acquisition. Therefore, time dispersion due to processing multiple heavy loads is avoided, an efficient server system operation is achieved, and increases in processing time is prevented. In particular, when operating a shared main memory multiprocessor as plural logical system units, efficient load balancing compared to the related art can be achieved without additional or special hardware, by changing only the operation method, even in a structure utilizing only a CPU and a portion of the main memory device to make up the shared main memory multiprocessor system that constitutes the multi-layer server system controller and the shared memory means.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A multi-layer server system, comprising:
  a plurality of servers which are grouped into first layer servers provided for handling to process requests issued from client terminals and second layer servers, a selected one of the first layer servers issuing a data acquisition request to one of the second layer servers when said selected first layer server determining a need for data from said one of the second layer servers;
  load balancing means for monitoring work statuses of the first layer servers, for selecting said selected first layer server from the first layer servers based on first work statuses of the first layer servers which are monitored when the multi-layer server system receives at least one process request from at least one, client terminal for connecting the client terminal with the selected first layer server, for facilitating selecting another first layer server among the first layer servers to take over processing of said process request based on second work statuses of the first layer servers which are monitored after the data is made available by said one of the second layer servers in response to the data acquisition request, and for connecting the client terminal with the selected another first layer server;

shared memory means accessible by the first and second layer servers and for storing process information needed for starting processing of said process request or resuming the processing of said process request after said selected first layer server has stopped the processing of said process request therein; and a system controller for controlling the first layer servers and the load balancing means by instructing the selected another first layer server to resume the processing of said process request thereby switching the processing of said process request among the first layer servers based on the second work statuses of the first layer servers.

2. A multi-layer server system according to claim 1, further comprising: process information generating means for generating according to the processing of said process request the process information needed for starting or resuming the processing of said process request.

3. A multi-layer server system according to claim 1, wherein the selected first layer server requests the data from said one of the second layer servers and records the process information in the shared memory means before stopping the processing of said process request therein.

4. A multi-layer server system according to claim 1, wherein the system controller inquires each of the first layer servers about a respective processing load being executed therein except for a load associated with the processing of said process request so as to select said one or another first layer server with a smallest load at respective time points.

5. A multi-layer server system according to claim 1, wherein the system controller inquires each of the first layer servers about a respective number of processes being executed therein except for processes associated with the processing of said process request so as to select said one or another first layer server with a smallest number of processes at respective time points.

6. A multi-layer server system according to claim 1, wherein the data made available by the second layer server is requested by and transferred to the system controller.

7. A multi-layer server system according to claim 1, wherein the data made available by the second layer server is transferred from the system controller to said selected another first layer server to use the data to resume the processing of said process request therein.

8. A multi-layer server system according to claim 1, wherein said another first layer server searched the shared memory means for the process information or a pointer of the process information to retrieve or copy the process information so as to resume the processing of said process request therein.

9. A multi-layer server system according to claim 1, wherein the load balancing means inquires the first layer servers about the first work statuses when the multi-layer server system receives the process request.

10. A multi-layer server system according to claim 1, wherein the system controller inquires about the second work statuses existing after the data is made available by said one of the second layer servers, selects said another first layer server, instructs the load balancing means to disconnect said selected first layer server from the client terminal and to connect said selected another first layer server with the client terminal.

11. A multi-layer server system according to claim 1, wherein the load balancing means is requested by the system controller to inquire the second work statuses of the first layer servers, select said another first layer server, and provide an ID of said selected another first layer server to the system controller.

12. A multi-layer server system according to claim 1, wherein the client terminal is a client server.

13. A multi-layer server system according to claim 1, wherein the first layer is a web server layer or an application server layer.

14. A multiprocessor system, comprising:

a plurality of information processors partitioned into a first logical system unit including first information processors provided for handling to process requests issued from client terminals and a second logical system unit including second information processors, a selected one of the first information processors issuing a data acquisition request to one of the second information processors when said selected first information processor determining a need for data from said one of the second information processors;

load balancing means for monitoring work statuses of the first information processors, for selecting said selected first information processor of the first logical system unit based on first work statuses of the first information processors of the first logical system unit which are monitored when the multiprocessor system receives a process request from a client terminal, for connecting the client terminal with the selected first information processor of the first logical system unit, for facilitating selecting another first information processor of the first logical system unit based on second work statuses of the first information processors of the first logical system unit which are monitored after the data is made available by said one of the second information processors in response to the data acquisition request, and for connecting the client terminal with the selected another first information processor of the first logical system unit;

shared memory means accessible by the first and second information processors and for storing process information needed for starting processing of said process request or resuming the processing of said process request after the selected first information processor has stopped the processing of said process request therein; and a system controller for controlling the first and second information processors and the load balancing means by instructing the selected another first information processor to resume the processing of said process request from the selected first information processor thereby switching the processing of said process request among the first information processors of the first logical system unit based on the second work statuses of the first information processors of the first logical system unit.

15. A multiprocessor system according to claim 14, further comprising: process information generating means for generating according to the processing of said process request the process information needed for starting or resuming the processing of said process request.

16. A multiprocessor system according to claim 14, wherein the system controller inquires about the second work statuses of the first information processors of the first logical system unit after the data is made available by said one of the second information processors, selects the another first information processor, instructs the load balancing means to disconnect the selected first information processor from the client terminal and to connect the selected another first information processor with the client terminal.

17. A multiprocessor system according to claim 14, wherein the load balancing device is requested by the system controller to inquire the second work statuses of the first information processors of the first logical system unit, select the another first information processor, and provide an ID of the selected another first information processor to the system controller.

\* \* \* \* \*